United States Patent
Wang et al.

(10) Patent No.: US 11,396,423 B2
(45) Date of Patent: Jul. 26, 2022

(54) TRASH CONTAINER WITH INDUCTION ACTUATED COVER AND ADJUSTABLE DETECTION DISTANCE ARRANGEMENT AND ITS CONTROLLING METHOD

(71) Applicants: Nine Stars Group (U.S.A.) Inc., Chino, CA (US); Fujian Nashida Electronic Incorporated Company, Fujian (CN)

(72) Inventors: Xin Wang, Fuzhou (CN); Jiangqun Chen, Fuzhou (CN); Zhou Lin, Fuzhou (CN)

(73) Assignees: Nine Stars Group (U.S.A.) Inc., Chino, CA (US); Fujian Nashida Electronic Incorporated Company, Fujian (CN)

( * ) Notice: Subject to any disclaimer, the term of this patent is extended or adjusted under 35 U.S.C. 154(b) by 369 days.

(21) Appl. No.: 16/609,746

(22) PCT Filed: May 19, 2017

(86) PCT No.: PCT/CN2017/085027
§ 371 (c)(1),
(2) Date: Oct. 31, 2019

(87) PCT Pub. No.: WO2018/201528
PCT Pub. Date: Nov. 8, 2018

(65) Prior Publication Data
US 2020/0062499 A1 Feb. 27, 2020

(30) Foreign Application Priority Data

May 4, 2017 (CN) .......................... 201710309082.1

(51) Int. Cl.
*B65F 1/16* (2006.01)

(52) U.S. Cl.
CPC ...... *B65F 1/1638* (2013.01); *B65F 2210/168* (2013.01)

(58) Field of Classification Search
CPC ...................... B65F 1/1638; B65F 2210/168
(Continued)

(56) References Cited

U.S. PATENT DOCUMENTS

2008/0264942 A1* 10/2008 Shek ................. B65F 1/1638
 220/211
2015/0298903 A1* 10/2015 Luxford .................. H04Q 9/00
 340/870.16
(Continued)

*Primary Examiner* — J. Gregory Pickett
*Assistant Examiner* — Niki M Eloshway
(74) *Attorney, Agent, or Firm* — Raymond Y. Chan; David and Raymond Patent Firm (57) ABSTRACT

A trash can includes an induction actuated cover being actuated to move between an closed position and an opened position in response to an object, an actuation module being activated at one of an operation mode and a setting mode, and an adjustable detection distance arrangement. At the operation mode, the induction actuated cover is moved from the closes position to the opened position when the object is detected above an induction window within a detection range at a preset detection distance. The adjustable detection distance arrangement is arranged to store a desired detection distance at the setting mode. The desired detection distance is selectively adjusted from the induction window and is defined as a distance of the object placed above the induction window. The desired detection distance is stored to replace the preset detection distance for actuating the induction actuated cover at the operation mode.

4 Claims, 3 Drawing Sheets

(58) Field of Classification Search
USPC .......................................................... 220/211
See application file for complete search history.

(56) References Cited

U.S. PATENT DOCUMENTS

| | | | |
|---|---|---|---|
| 2016/0347540 A1* | 12/2016 | Skocypec | ................. B65F 1/14 |
| 2017/0090447 A1* | 3/2017 | Skocypec | ........... B65B 67/1233 |
| 2017/0096299 A1* | 4/2017 | Yang | ....................... G10L 25/51 |
| 2018/0229930 A1* | 8/2018 | Shek | ..................... B65F 1/1607 |
| 2019/0283964 A1* | 9/2019 | Wang | ....................... H02P 7/20 |

* cited by examiner

TRASH CONTAINER WITH INDUCTION ACTUATED COVER AND ADJUSTABLE DETECTION DISTANCE ARRANGEMENT AND ITS CONTROLLING METHOD

CROSS REFERENCE OF RELATED APPLICATION

This is a non-provisional application that claims priority to international application number PCT/CN2017/085027, international filing date May 19, 2017, which claims priority to Chinese application number CN201710309082.1, filing date May 4, 2017, the entire contents of each of which are expressly incorporated herein by reference.

NOTICE OF COPYRIGHT

A portion of the disclosure of this patent document contains material which is subject to copyright protection. The copyright owner has no objection to any reproduction by anyone of the patent disclosure, as it appears in the United States Patent and Trademark Office patent files or records, but otherwise reserves all copyright rights whatsoever.

BACKGROUND OF THE PRESENT INVENTION

Field of Invention

The present invention relates to a trash container, and more particularly to a trash container with an induction actuated cover and an adjustable detection distance arrangement, and its controlling method.

Description of Related Arts

The operation of an existing trash container with an active infrared sensor comprises the steps of: upwardly emitting an infrared signal by an infrared emitting tube through a sensing window; reflecting back the infrared signal by an object when the object approaches to the sensing window at a predetermined sensing distance; receiving the reflected infrared signal as a weak signal by an infrared receiving tube located underneath the sensing window; amplifying the weak signal as an analog signal by an amplifier, and comparing the analog signal with a reference analog threshold by a comparing module. If the value of the analog signal is smaller than the reference analog threshold, an output of the comparing module is set at a low level, such that the lid of the trash container will not be opened. If the value of the analog signal is greater than the reference analog threshold, the output of the comparing module is set at a high level, such that a microcomputer control chip is activated to start a lid opening program. The motor is actuated for generating a rotational power by an output terminal of the microcomputer control chip through a driver circuit. Then, the motor is arranged to drive a speed reducer to rotate in order to open up the lid of the trash container. When the distance between the object and the sensing window is greater than the predetermined sensing distance, the sensing induction will not be occurred. When the distance between the object and the sensing window is smaller than the predetermined sensing distance, the sensing induction will be occurred. The sensing distance refers to a sensing range of the trash container.

The sensing distance of the existing active infrared induction trash container in the market is non-adjustable, wherein the sensing distance is set around 20 cm from the sensing window by a test of moving hand as the object. Due to the different environments of the usage of the infrared induction trash container, the infrared induction trash container is placed underneath the countertop, such that the infrared induction trash container is always retained at an inducted state and cannot be operated properly. Furthermore, due to the different requirements for different users, some users needs a longer sensing distance with a higher sensitivity or some users needs a shorter sensing distance with a lower sensitivity to prevent any mis-operation of the trash container. In other words, if the sensing distance is adjustable, the trash container can set to meet different user needs. At the same time, since the existing trash container is arranged to compare the analog voltage signals, it is susceptible to have a signal interference and the operation of the circuit is not stable.

SUMMARY OF THE PRESENT INVENTION

The invention is advantageous in that it provides a trash container with an induction actuated cover and an adjustable detection distance arrangement, and its controlling method, wherein the user is able to selectively adjust the detection distance according to the needs of the user, such that the trash container can be customized as the personalized item in the market. At the same time, the analog voltage signal comparison mode is converted to the digital comparison mode to minimize any circuit interference and to enhance the relatively stable operation of the circuit.

According to the present invention, the foregoing and other objects and advantages are attained by a trash container, which comprises an infrared emitter, an infrared receiver, an amplifier, a digital converter, an analog-to-digital conversion result register, a preset detection distance register, an adjusting detection distance register, a comparison program, a microcomputer program control unit, a set button, a driver circuit, a motor, a decelerator, an induction actuated cover, and an induction window. The amplifier is constructed by an amplifier chip and its peripheral RC components. The amplifier chip, the analog-to-digital converter, the analog-to-digital conversion result register, the preset detection distance register, the adjusting detection distance register, the comparison program, and the microcomputer program control unit are all integrated to form a microcomputer control chip with an integrated circuit. The infrared emitter and the infrared receiver are located underneath the detection window which is a transparent window:

The microcomputer control chip comprises a first port 3A, a second port 3B, a third port 3C, and a fourth port 3D. The first port 3A is electrically connected to the infrared emitter. The third port 3C is electrically connected to the driver circuit. The second port 3B is electrically connected to the infrared receiver. The fourth port 3D is electrically connected to the set button. The driver circuit is sequentially connected to the induction actuated cover via the motor and the decelerator in order for driving the induction actuated cover between a closed position and an opened position, so as to perform a pivotally flipping operation of the induction actuated cover. The infrared receiver is sequentially connected to the comparison program via the amplifier, the analog to digital converter, and the analog to digital conversion result register in order. The comparison program is also connected to the preset detection distance register and the adjusting detection distance register. The infrared emitter, the driver circuit, the set button, the adjusting detection distance register, the preset detection distance register, the comparison program, the analog to digital conversion result register, and the analog to digital converter are all connected to the microcomputer program control unit.

At the default setting of the detection distance, the detection distance is set at a preset detection distance. The comparison program is activated by comparing the current value of the analog-to-digital conversion result register with the preset threshold of the preset detection distance register in order to actuate the induction actuated cover from the closed position to the opened position. When the value of the analog-to-digital conversion result register is smaller than the preset threshold of the preset detection distance register, the induction actuated cover will not be opened. When the value of the analog-to-digital conversion result register is greater than the preset threshold of the preset detection distance register, the induction actuated cover will be actuated for moving the induction actuated cover to the opened position. In order to adjust the detection distance, the user is able to actuate, such as by pressing, the set button. Then, an object, such as the user's hand, is placed above the induction window to adjust the detection distance between the user's hand and the induction window. Then, the program is activated at a setting mode to read a distance setting date of the detection distance being set by the user. The distance setting data is stored in the adjusting detection distance register. As a result, the detection distance is adjusted and set for subsequent use of the trash container. The comparison program is activated by comparing the current value of the analog-to-digital conversion result register with the adjusted detection distance value of the adjusting detection distance register in order to actuate the induction actuated cover from the closed position to the opened position. When the value of the analog-to-digital conversion result register is smaller than the adjusted detection distance value of the adjusting detection distance register, the induction actuated cover will not be opened. When the value of the analog-to-digital conversion result register is greater than the adjusted detection distance value of the adjusting detection distance register, the induction actuated cover will be actuated for moving the induction actuated cover to the opened position.

Accordingly, the induction circuit of the conventional induction trash container is constructed to have two control chips and a plurality of peripheral resistance-capacitance components. One of the control chips is an amplifier chip and another one is the microcomputer control chip. Therefore, the circuit configuration of the conventional trash container is complicated, and there are lots of welding connections at the circuit board of the conventional trash container, such that the cost of the conventional trash container is relatively high. In view of the present invention, the trash container incorporates with a single digital chip to simplify the circuit configuration, to minimize any welding connection at the circuit board, to lower the manufacturing cost, to reduce the failure operation rate, to minimize the circuit board size, and to lower the overall cost of the trash container.

Accordingly, before the microcomputer control chip is powered on, if the set button is not pressed, the detection distance is the default detection distance for the subsequent use. When the set button 8 is pressed, the microcomputer control chip is activated at the setting mode after it is powered on. Then, after the setting adjustment is completed, the detection distance is set as the current sensing distance for the subsequent use. There are two following advantages for adjusting the detection distance after the microcomputer control chip is powered on. The first advantage is that the set button 8 can be used for other operations after the microcomputer control chip is powered on. For example, the set button can be a normal actuation opening button or a manual closing button, etc. The second advantage is that the user does not need to input a numerical distance or does not need to read the user manual before the adjustment. There is no difference between the operation and the use of the trash container, so as to prevent any confusion during the use. It should be appreciated that the adjustment arrangement of the instant invention can be incorporated with any conventional induction trash container, such as adding an individual set button of the present invention into the conventional induction circuit, in order to selectively adjust the detection distance of the trash container. Of course, this configuration may cause the mis-operation of the trash container for the user.

Furthermore, the microcomputer control chip further comprises an R20 register, wherein the R20 register is connected to the preset detection distance register, the adjusting detection distance register, and the comparison program for temporarily storing the preset threshold of the preset detection distance register or the adjusted detection distance value of the adjusting detection distance register in order to compare with the value of the analog-to-digital conversion result register by the comparison program.

In accordance with another aspect of the invention, the present invention comprises a controlling method for the trash container with the above mentioned adjustable detection distance, wherein the controlling method comprises the following steps:

Step S1: After the microcomputer control chip is powered on, determine whether it is a power-on operation or a wake-up reset operation. When it is a power-on operation, it proceeds to Step S2. When it is a wake-up reset operation, it proceeds to Step S5.

Step S2: Program initialization. The first terminal 3A of the microcomputer control chip is set as an output terminal, and the infrared emitter is controlled not to emit infrared signal. The second terminal 3B is set as an analog input terminal of the amplifier. The third terminal 3C is set as an output terminal, and the control drive circuit is deactivated to not operate. The fourth terminal 3D is set as an input terminal, and is pulled up.

Step S3: Determine whether the set button is pressed, preferably press and hold action on the set button. If the set button is not pressed, the fourth terminal 3D of the microcomputer control chip is activated to proceed to step S4 since the pull-up is set at a high level. If the set button is pressed, the fourth terminal 3D is set at a low level. Then, the program is arranged to enter into the setting mode and to proceed to step S13.

Step S4: Assign the preset threshold of the preset detection distance register to the R20 register, and proceed to step S5.

Step S5: Output a pulse signal at the first terminal 3A of the microcomputer control chip, and control the infrared emitter to emit the infrared pulse signal to the detection range, and proceed to step S6.

Step S6: Receive a reflected signal by the infrared receiver, amplify the analog signal by the amplifier, and convert the analog signal into a digital signal via an analog-to-digital conversion by the analog-to-digital converter, then proceed to step S7.

Step S7: Store the analog-to-digital conversion result of the current analog-to-digital converter as a stored value in the analog-to-digital conversion result register, and proceed to step S8.

Step S8: Compare the stored value of the analog-to-digital conversion result register with the value of the R20 register. If the value of the analog to digital conversion result register is smaller than the value of the R20 register, proceeds to step S9. If the value of the analog-to-digital conversion result register is greater than the value of the R20 register, proceed to step S10.

Step S9: The microcomputer control chip enters the sleep power saving state 300 mS, wherein the microcomputer control chip can be woken up and returned to step S1.

Step S10: The microcomputer control chip is arranged to control the driver circuit through the third terminal 3C to actuate the motor for generating the rotational power in the forward direction, and the motor is arranged to drive the decelerator to open up the induction actuated cover, and proceed to step S1.

Step S11: The microcomputer control chip is arranged to control the driver circuit through the third terminal 3C to stop the actuation of the motor, and to maintain the induction actuated cover at the opened position for a predetermined time interval, such as 3 seconds, proceed to step S12.

Step S12: The microcomputer control chip is arranged to the driver circuit through the third terminal 3C to actuate the motor for generating the rotational power in the reverse direction, the motor is arranged to drive the decelerator to close the induction actuated cover, and return to step S9.

Step S13: Enter into the setting mode: the user or operator is arranged to place the object, such as the user hand, above the induction window within the detection range. The user is able to adjust the distance from the hand to the induction window to set the desired detection distance required by the user. When keeping the hand within the detection range with the desired detection distance, the set button being pressed by the other hand of the user is ready to release. Then, proceed to step S14.

Step S14: The program is arranged to continuously determine whether the set button is released. If the program determines that the set button is remained in a pressed position, the method continues to the step S14. If the program determines that the set button is released, proceed to step S15.

Step S15: The first terminal 3A of the microcomputer control chip is arranged to output a pulse signal, and to control the infrared emitter for emitting an infrared pulse signal to the detection range, and then proceed to step S16.

Step S16: The signal reflected by the user hand is received by the infrared receiver. The analog signal is amplified by the amplifier, and then the amplified analog signal is converted into a digital signal via an analog-to-digital conversion by the analog-to-digital converter. Then, proceed to step S17.

Step S17: Store the result/value of the analog-to-digital conversion of the analog-to-digital converter in the R20 register and return to step S5. Then, exit the setting mode, and enter the normal operation mode.

Particularly, in the setting step, the data or result stored in the R20 register is the data of the adjusted distance value. Accordingly, the R20 register is the adjusting detection register in this embodiment. The setup mode is not activated after the power-on operation, the preset threshold of the preset detection distance register is assigned to the R20 register. The R20 register is equivalent to the preset detection distance register for the subsequent use of the trash container.

Comparing to the conventional trash container, the present invention has the following advantages. Through the design of the present invention, the user is able to selectively adjust the detection distance according to the needs of the user, such that the trash container can be customized as the personalized item in the market. At the same time, the analog voltage signal comparison mode is converted to the digital comparison mode to minimize any circuit interference and to enhance the relatively stable operation of the circuit. The circuit configuration of the present invention requires only one integrated IC circuit, such that the circuit configuration of the present invention is simple and reliable to lower the failure rate, to simplify the manufacturing process, and to reduce the overall cost.

In the drawings: 1—Infrared emitter, 2—Infrared receiver, 3—Microcomputer control chip, 31—Amplifier, 32—Digital converter, 33—Analog-to-digital conversion result register, 34—Comparison program, 35—Adjusting detection distance register, 36—Preset detection distance register, 37—Microcomputer program control unit, 3A—Output control terminal (first terminal) of a microcomputer control chip to control the infrared transmitter to output infrared pulse, 3B—Amplifier analog signal input terminal (second terminal), 3C—Output terminal set (third terminal) of the microcomputer control chip control drive circuit, 3D—Input terminal (fourth terminal) of a connection between the microcomputer control chip and a push button switch, 4—Driver circuit, 5—Motor, 6—Decelerator, 7—Induction actuated cover, 8—Set button, 9—induction window P, IO—Detection range, 0P—Amplifier chip, R1-R6—Resistors of amplifier circuit, C1—C4—Capacitance of amplifier circuit

DETAILED DESCRIPTION OF THE PREFERRED EMBODIMENT

The following description is disclosed to enable any person skilled in the art to make and use the present invention.

Figure 1:
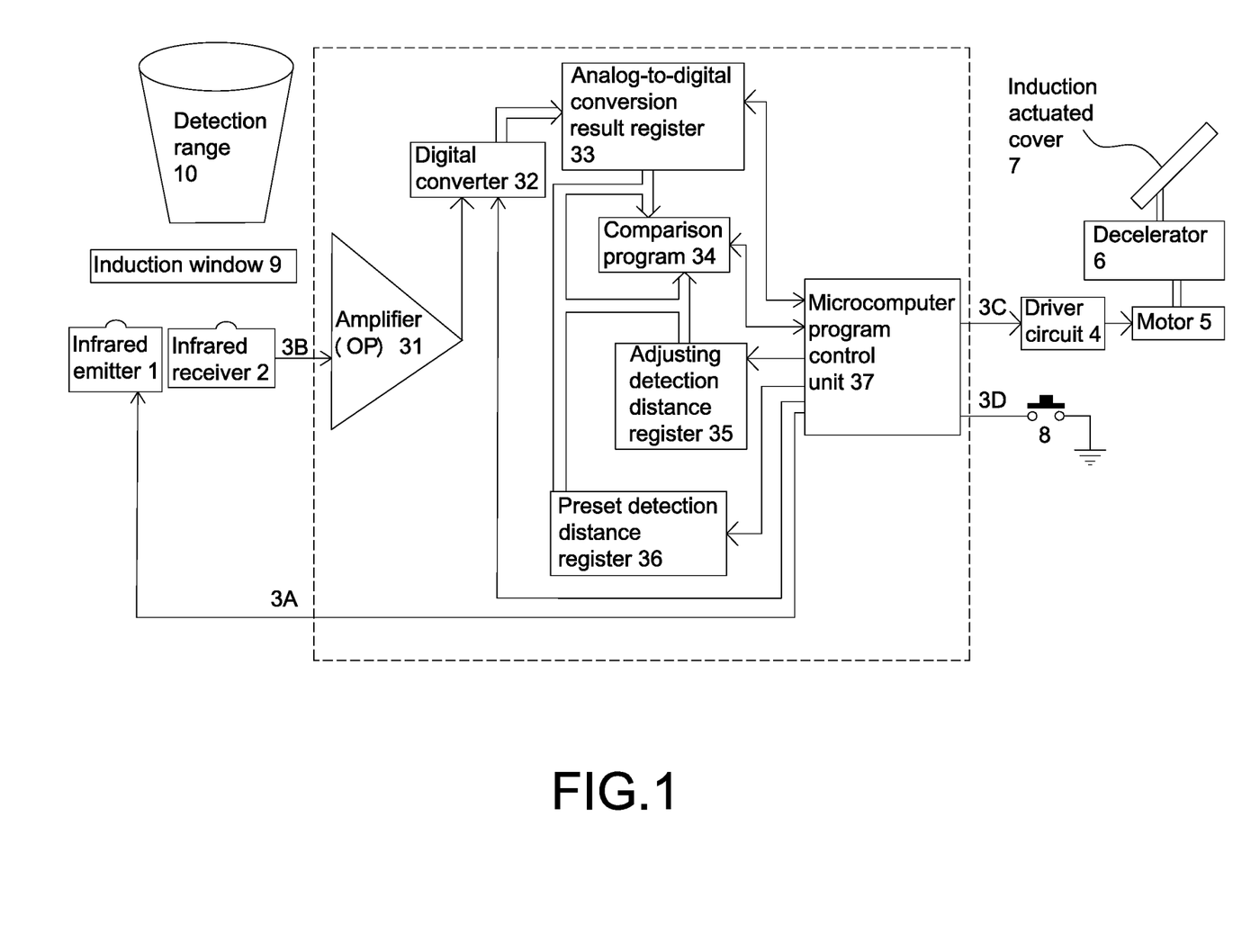
FIG. 1 is a circuit block diagram of a trash container according to a preferred embodiment of the present invention.
Figure 3:
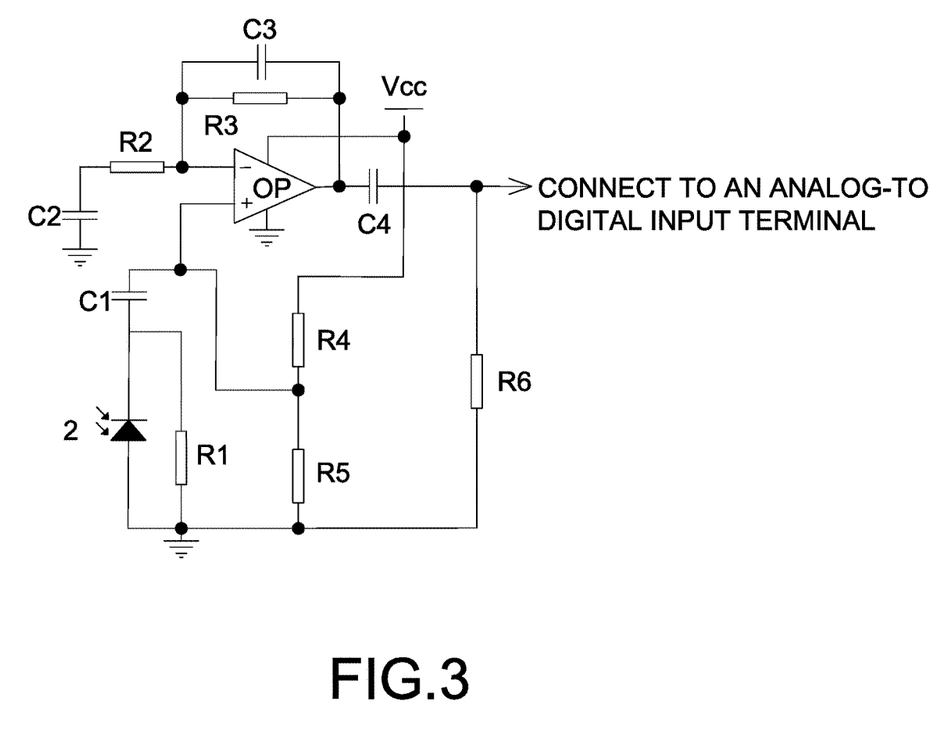
FIG. 3 is a circuit diagram of an amplifying circuit of the trash container according to the above preferred embodiment of the present invention.

As shown in FIG. 1 of the drawings, a trash container according to a preferred embodiment of the present invention is illustrated, wherein the trash container is able to allow a user to set and adjust a detection distance of the trash container. The trash container comprises an infrared emitter 1, an infrared receiver 2, an amplifier 31, a digital converter 32, an analog-to-digital conversion result register 33, a preset detection distance register 36, an adjusting detection distance register 35, a comparison program 34, a microcomputer program control unit 37, a set button 8, a driver circuit 4, a motor 5, a decelerator 6, an induction actuated cover 7, an induction window 9, and a detection range 10. The amplifier is constructed by an amplifier chip and its peripheral RC components. The amplifier chip, the analog-to-digital converter, the analog-to-digital conversion result register, the preset detection distance register, the adjusting detection distance register, the comparison program, and the microcomputer program control unit are all integrated to form a microcomputer control chip with an integrated circuit. The infrared emitter and the infrared receiver are located underneath the detection window which is a transparent window:

As shown in FIG. 3, the amplifier 31 is constructed by an amplifier chip (OP), resistors R1 to R6, and capacitors C1 to C4. In this embodiment, the amplifier chip (OP), the analog-to-digital converter 32, the analog-to-digital conversion result register 33, the preset detection distance register 36, the adjusting detection distance register 35, the comparison program 34, and the microcomputer program control unit 37 are integrated to form with the microcomputer control chip 3. Accordingly, the induction circuit of the conventional induction trash container is constructed to have two control chips and a plurality of peripheral R-C components. One of the control chips is an amplifier chip and another one is the microcomputer control chip. Therefore, the circuit configuration of the conventional trash container is complicated, and there are lots of welding connections at the circuit board of the conventional trash container, such that the cost of the conventional trash container is relatively high. In view of the present invention, the trash container incorporates with a single digital chip to simplify the circuit configuration, to minimize any welding connection at the circuit board, to lower the manufacturing cost, to reduce the failure operation rate, to minimize the circuit board size, and to lower the overall cost of the trash container.

The microcomputer control chip comprises a first port 3A, a second port 3B, a third port 3C, and a fourth port 3D. The first port 3A is electrically connected to the infrared emitter 1. The third port 3C is electrically connected to the driver circuit 4. The second port 3B is electrically connected to the infrared receiver 2. The fourth port 3D is electrically connected to the set button 8. The driver circuit 4 is sequentially connected to the induction actuated cover 7 via the motor 5 and the decelerator 6 in order for driving the induction actuated cover 7 between a closed position and an opened position, so as to perform a pivotally flipping operation of the induction actuated cover 7. The infrared receiver 2 is sequentially connected to the comparison program 34 via the amplifier 31, the analog to digital converter 32, and the analog to digital conversion result register 33 in order. The comparison program 34 is also connected to the preset detection distance register 36 and the adjusting detection distance register 35. The infrared emitter 1, the driver circuit 4, the set button 8, the adjusting detection distance register, the preset detection distance register 36, the comparison program 34, the analog to digital conversion result register 33, and the analog to digital converter 32 are all connected to the microcomputer program control unit 37. At the default setting of the detection distance, the detection distance is set at a preset detection distance. The comparison program is activated by comparing the current value of the analog-to-digital conversion result register 33 with the preset threshold of the preset detection distance register 36 in a percentage ratio in order to actuate the induction actuated cover 7 from the closed position to the opened position. When the value of the analog-to-digital conversion result register 33 is smaller than the preset threshold of the preset detection distance register 36, the induction actuated cover 7 will not be opened. When the value of the analog-to-digital conversion result register 33 is greater than the preset threshold of the preset detection distance register 36, the induction actuated cover 7 will be actuated for moving the induction actuated cover 7 to the opened position. In order to adjust the detection distance, the user is able to actuate, such as by pressing, the set button 8. Then, an object, such as the user's hand, is placed above the induction window 8 to adjust the detection distance between the user's hand and the induction window 8. Then, the program is activated at a setting mode to read a distance setting date of the detection distance being set by the user. The distance setting data is stored in the adjusting detection distance register 35. As a result, the detection distance is adjusted and set for subsequent use of the trash container. The comparison program is activated by comparing the current value of the analog-to-digital conversion result register 33 with the adjusted detection distance value of the adjusting detection distance register 35 in order to actuate the induction actuated cover 7 from the closed position to the opened position. When the value of the analog-to-digital conversion result register 33 is smaller than the adjusted detection distance value of the adjusting detection distance register 35, the induction actuated cover 7 will not be opened. When the value of the analog-to-digital conversion result register 33 is greater than the adjusted detection distance value of the adjusting detection distance register 35, the induction actuated cover 7 will be actuated for moving the induction actuated cover 7 to the opened position.

Accordingly, the induction circuit of the conventional induction trash container is constructed to have two control chips and a plurality of peripheral resistance-capacitance components. One of the control chips is an amplifier chip and another one is the microcomputer control chip. Therefore, the circuit configuration of the conventional trash container is complicated, and there are lots of welding connections at the circuit board of the conventional trash container, such that the cost of the conventional trash container is relatively high. In view of the present invention, the trash container incorporates with a single digital chip to simplify the circuit configuration, to minimize any welding connection at the circuit board, to lower the manufacturing cost, to reduce the failure operation rate, to minimize the circuit board size, and to lower the overall cost of the trash container.

According to the preferred embodiment, before the microcomputer control chip 3 is powered on, if the set button 8 is not pressed, the detection distance is the default detection distance for the subsequent use (the default detection distance is preset by a manufacturer of the trash container and cannot be changed). When the set button 8 is pressed, the microcomputer control chip 3 is activated at the setting mode after it is powered on. Then, after the setting adjustment is completed, the detection distance is set as the current sensing distance for the subsequent use. There are two following advantages for adjusting the detection distance after the microcomputer control chip 3 is powered on. The first advantage is that the set button 8 can be used for other operations after the microcomputer control chip 3 is powered on. For example, the set button 8 can be a normal actuation opening button or a manual closing button, etc. The second advantage is that the user does not need to input a numerical distance or does not need to read the user manual before the adjustment. There is no difference between the operation and the use of the trash container, so as to prevent any confusion during the use. It should be appreciated that the adjustment arrangement of the instant invention can be incorporated with any conventional induction trash container, such as adding an individual set button of the present invention into the conventional induction circuit, in order to selectively adjust the detection distance of the trash container. Of course, this configuration may cause the mis-operation of the trash container for the user.

In this embodiment, the microcomputer control chip 3 further comprises an R20 register, wherein the R20 register is connected to the preset detection distance register 36, the adjusting detection distance register 35, and the comparison program 34 for temporarily storing the preset threshold of the preset detection distance register 36 or the adjusted detection distance value of the adjusting detection distance register 35 in order to compare with the value of the analog-to-digital conversion result register 33 by the comparison program 34.

Figure 2:
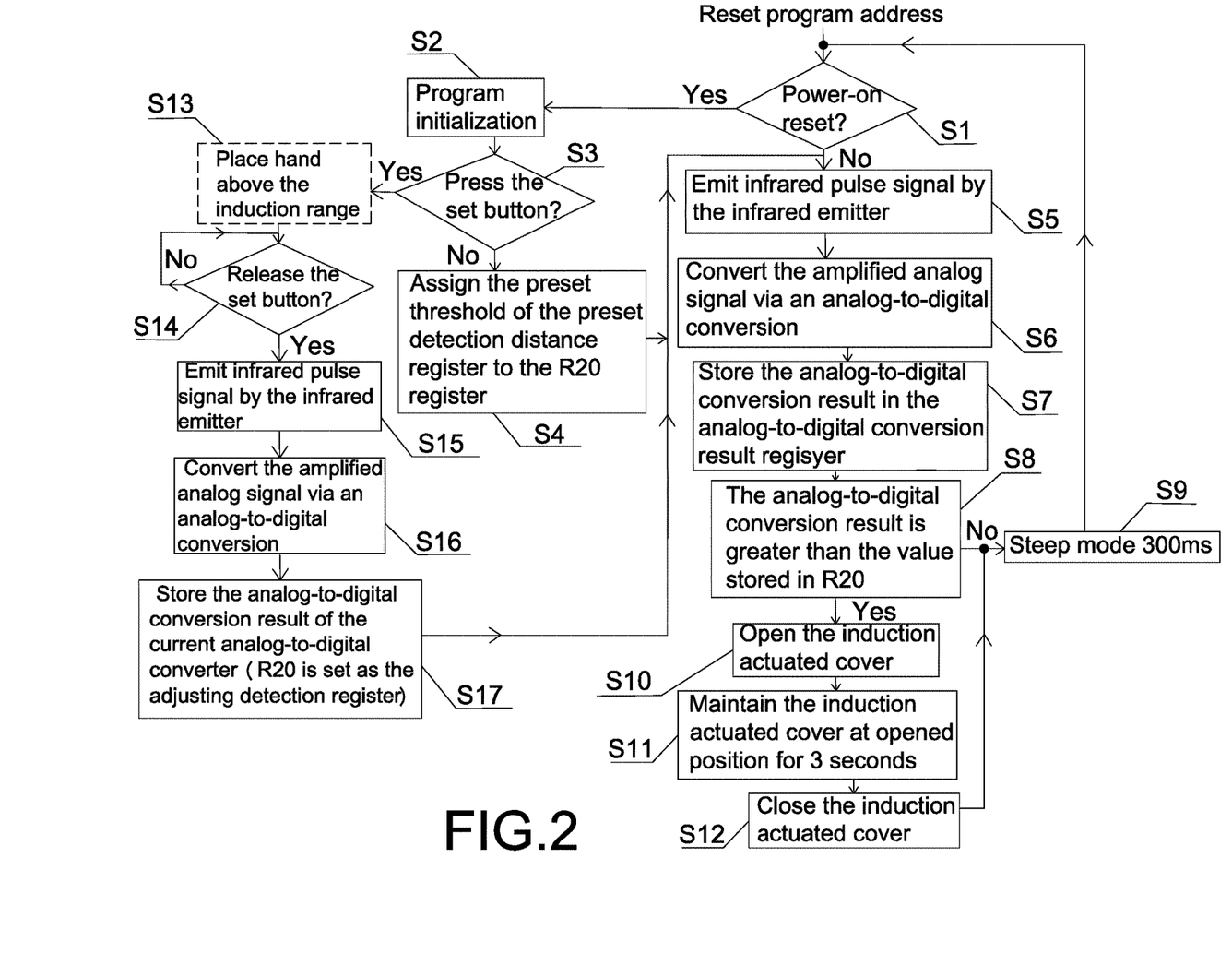
FIG. 2 is a flow chart of a controlling method of the trash container according to the above preferred embodiment of the present invention.

As shown in FIG. 2, the present invention further provides a controlling method for the trash container with the above mentioned adjustable detection distance, wherein the controlling method comprises the following steps:

Step S1: After the microcomputer control chip 3 is powered on, determine whether it is a power-on operation or a wake-up reset operation. When it is a power-on operation, it proceeds to Step S2. When it is a wake-up reset operation, it proceeds to Step S5.

Step S2: Program initialization. The first terminal 3A of the microcomputer control chip 3 is set as an output terminal, and the infrared emitter 1 is controlled not to emit infrared signal. The second terminal 3B is set as an analog input terminal of the amplifier. The third terminal 3C is set as an output terminal, and the control drive circuit 4 is deactivated to not operate. The fourth terminal 3D is set as an input terminal, and is pulled up.

Step S3: Determine whether the set button 8 is pressed, preferably press and hold action on the set button 8. If the set button 8 is not pressed, the fourth terminal 3D of the microcomputer control chip 3 is activated to proceed to step S4 since the pull-up is set at a high level. If the set button 8 is pressed, the fourth terminal 3D is set at a low level. Then, the program is arranged to enter into the setting mode and to proceed to step S13.

Step S4: Assign the preset threshold of the preset detection distance register 36 to the R20 register, and proceed to step S5.

Step S5: Output a pulse signal at the first terminal 3A of the microcomputer control chip 3, and control the infrared emitter 1 to emit the infrared pulse signal to the detection range 10, and proceed to step S6.

Step S6: Receive a reflected signal by the infrared receiver 2, amplify the analog signal by the amplifier 31, and convert the analog signal into a digital signal via an analog-to-digital conversion by the analog-to-digital converter 32, then proceed to step S7.

Step S7: Store the analog-to-digital conversion result of the current analog-to-digital converter 32 as a stored value in the analog-to-digital conversion result register 33, and proceed to step S8.

Step S8: Compare the stored value of the analog-to-digital conversion result register 33 with the value of the R20 register. If the value of the analog to digital conversion result register 33 is smaller than the value of the R20 register, proceeds to step S9. If the value of the analog-to-digital conversion result register 33 is greater than the value of the R20 register, proceed to step S10.

Step S9: The microcomputer control chip 3 enters the sleep power saving state 300 mS, wherein the microcomputer control chip 3 can be woken up and returned to step S1.

Step S10: The microcomputer control chip 3 is arranged to control the driver circuit 4 through the third terminal 3C to actuate the motor 5 for generating the rotational power in the forward direction, and the motor 5 is arranged to drive the decelerator 6 to open up the induction actuated cover 7, and proceed to step S1.

Step S11: The microcomputer control chip 3 is arranged to control the driver circuit 4 through the third terminal 3C to stop the actuation of the motor 5, and to maintain the induction actuated cover 7 at the opened position for a predetermined time interval, such as 3 seconds, proceed to step S12.

Step S12: The microcomputer control chip 3 is arranged to the driver circuit 4 through the third terminal 3C to actuate the motor 5 for generating the rotational power in the reverse direction, the motor 5 is arranged to drive the decelerator 6 to close the induction actuated cover 7, and return to step S9.

Step S13: Enter into the setting mode: the user or operator is arranged to place the object, such as the user hand, above the induction window 9 within the detection range 10. The user is able to adjust the distance from the hand to the induction window 9 to set the desired detection distance required by the user. When keeping the hand within the detection range 10 with the desired detection distance, the set button 8 being pressed by the other hand of the user is ready to release. Then, proceed to step S14.

Step S14: The program is arranged to continuously determine whether the set button 8 is released. If the program determines that the set button 8 is remained in a pressed position, the method continues to the step S14. If the program determines that the set button 8 is released, proceed to step S15.

Step S15: The first terminal 3A of the microcomputer control chip 3 is arranged to output a pulse signal, and to control the infrared emitter 1 for emitting an infrared pulse signal to the detection range 10, and then proceed to step S16.

Step S16: The signal reflected by the user hand is received by the infrared receiver 2. The analog signal is amplified by the amplifier 31, and then the amplified analog signal is converted into a digital signal via an analog-to-digital conversion by the analog-to-digital converter 32. Then, proceed to step S17.

Step S17: Store the result/value of the analog-to-digital conversion of the analog-to-digital converter 32 in the R20 register and return to step S5. Then, exit the setting mode, and enter the normal operation mode.

Particularly, according to the preferred embodiment, the data or result stored in the R20 register is the data of the adjusted distance value. Accordingly, the R20 register is the adjusting detection register in this embodiment. It the setup mode is not activated after the power-on operation, the preset threshold of the preset detection distance register is assigned to the R20 register. The R20 register is equivalent to the preset detection distance register for the subsequent use of the trash container.

It will thus be seen that the objects of the present invention have been fully and effectively accomplished. The embodiments have been shown and described for the purposes of illustrating the functional and structural principles of the present invention and is subject to change without departure from such principles. Therefore, this invention includes all modifications encompassed within the spirit and scope of the following claims.

What is claimed is:

1. A trash container, comprising:
an infrared emitter, an infrared receiver, an amplifier, a analog-to-digital converter, an analog-to-digital conversion result register, a preset detection distance register, an adjusting detection distance register, a comparison program, a microcomputer program control unit, a set button, a driver circuit, a motor, a decelerator, an induction actuated cover, and an induction window, wherein the amplifier is constructed by an amplifier chip and peripheral RC components thereof, wherein the amplifier chip, the analog-to-digital converter, the analog-to-digital conversion result register, the preset detection distance register, the adjusting detection distance register, the comparison program, and the microcomputer program control unit are all integrated to form a microcomputer control chip with an integrated circuit, wherein the infrared emitter and the infrared receiver are located underneath a detection window which is a transparent window, wherein the microcomputer control chip comprises a first port, a second port, a third port, and a fourth port, wherein the first port is electrically connected to the infrared emitter, wherein the third port is electrically connected to the driver circuit, wherein the second port 3B is electrically connected to the infrared receiver, wherein the fourth port is electrically connected to the set button, wherein the driver circuit is sequentially connected to the induction actuated cover via the motor and the decelerator in order for driving the induction actuated cover between a closed position and an opened position, so as to perform a pivotally flipping operation of the induction actuated cover, wherein the infrared receiver is sequentially connected to the comparison program via the amplifier, the analog-to-digital converter, and the analog-to-digital conversion result register in order, wherein the comparison program is also connected to the preset detection distance register and the adjusting detection distance register, wherein the infrared emitter, the driver circuit, the set button, the adjusting detection distance register, the preset detection distance register, the comparison program, the analog-to-digital conversion result register, and the analog-to-digital converter are all connected to the microcomputer program control unit, wherein at the default setting of the detection distance, the detection distance is set at a preset detection distance, wherein the comparison program is activated by comparing the current value of the analog-to-digital conversion result register with a preset threshold of the preset detection distance register in order to actuate the induction actuated cover from the closed position to the opened position, wherein when the value of the analog-to-digital conversion result register is smaller than the preset threshold of the preset detection distance register, the induction actuated cover will not be opened, wherein when the value of the analog-to-digital conversion result register is greater than the preset threshold of the preset detection distance register, the induction actuated cover will be actuated for moving the induction actuated cover to the opened position, wherein in order to adjust the detection distance, the user is able to actuate, such as by pressing, the set button, wherein an object, such as the user's hand, is placed above the induction window to adjust the detection distance between the user's hand and the induction window, wherein the program is activated at a setting mode to read a distance setting data of the detection distance being set by the user, wherein the distance setting data is stored in the adjusting detection distance register, wherein as a result, the detection distance is adjusted and set for subsequent use of the trash container, wherein the comparison program is activated by comparing the current value of the analog-to-digital conversion result register with the adjusted detection distance value of the adjusting detection distance register in order to actuate the induction actuated cover from the closed position to the opened position, wherein when the value of the analog-to-digital conversion result register is smaller than the adjusted detection distance value of the adjusting detection distance register, the induction actuated cover will not be opened, wherein when the value of the analog-to-digital conversion result register is greater than the adjusted detection distance value of the adjusting detection distance register, the induction actuated cover will be actuated for moving the induction actuated cover to the opened position.

2. The trash container, as recited in claim 1, wherein before the microcomputer control chip is powered on, if the set button is not pressed, the detection distance is the default detection distance for the subsequent use, wherein when the set button 8 is pressed, the microcomputer control chip is activated at the setting mode after it is powered on, wherein, after a setting adjustment is completed, the detection distance is set as the current sensing distance for the subsequent use.

3. The trash container, as recited in claim 1, wherein the microcomputer control chip further comprises an R20 register, wherein the R20 register is connected to the preset detection distance register, the adjusting detection distance register, and the comparison program for temporarily storing the preset threshold of the preset detection distance register or the adjusted detection distance value of the adjusting detection distance register in order to compare with the value of the analog-to-digital conversion result register by the comparison program.

4. A controlling method for a trash container, comprising steps of:
   Step S1: after a microcomputer control chip is powered on, determining whether it is a power-on operation or a wake-up reset operation, wherein when it is a power-on operation, proceeding to Step S2 and when it is a wake-up reset operation, proceeding to Step S5;
   Step S2: setting a first terminal of the microcomputer control chip as an output terminal, and controlling an infrared emitter not to emit infrared signaler, a second terminal being set as an analog input terminal of an amplifier and a third terminal being set as an output terminal, a control drive circuit being deactivated to not operate, and a fourth terminal being set as an input terminal and being pulled up;
   Step S3: determining whether a set button is pressed, preferably a press-and-hold action on the set button, wherein if the set button is not pressed, the fourth terminal of the microcomputer control chip is activated to proceed to Step S4 since a pull-up is set at a high level, and if the set button is pressed, the fourth terminal is set at a low level, wherein a program is arranged to enter into a setting mode and to proceed to Step S13;
   Step S4: assigning a preset threshold of a preset detection distance register to a R20 register, and proceeding to step S5;
   Step S5: outputting a pulse signal at the first terminal of the microcomputer control chip, controlling the infrared emitter to emit an infrared pulse signal to the detection range, and proceeding to Step S6;
   Step S6: receiving a reflected signal by an infrared receiver, amplifying an analog signal by the amplifier, converting the analog signal into a digital signal via an analog-to-digital conversion by an analog-to-digital converter, and proceeding to Step S7;

Step S7: storing a result of the analog-to-digital conversion of the analog-to-digital converter in an analog-to-digital conversion result register, and proceeding to Step S8;

Step S8: comparing a value of the analog-to-digital conversion result register with a value of the R20 register if the value of the analog-to-digital conversion result register is smaller than the value of the R20 register, proceeding to Step S9, and if the value of the analog-to-digital conversion result register is greater than the value of the R20 register, proceeding to Step S10;

Step S9: entering the microcomputer control chip a sleep power saving state 300 mS, wherein the microcomputer control chip is able to be woken up and returned to the Step S1;

Step S10: arranging the microcomputer control chip to control a driver circuit through the third terminal to actuate a motor for generating a rotational power in a forward direction, wherein the motor is arranged to drive a decelerator to open up an induction actuated cover, and proceeding to Step S1;

Step S11: arranging the microcomputer control chip to control the driver circuit through the third terminal to stop an actuation of the motor, and to maintain the induction actuated cover at an opened position for a predetermined time interval, and proceeding to Step S12;

Step S12: arranging the microcomputer control chip to the driver circuit through the third terminal to actuate the motor for generating the rotational power in a reverse direction, wherein the motor is arranged to drive the decelerator to close the induction actuated cover, and returning to the Step S9;

Step S13: entering into a setting mode, wherein a user or operator is arranged to place an object above an induction window within a detection range, wherein the user is able to adjust a distance from a hand of the user to the induction window to set a desired detection distance required by the user, when keeping the hand within the detection range with the desired detection distance, the set button being pressed by the other hand of the user is ready to release and proceeding to Step S14;

Step S14: arranging the program to continuously determine whether the set button is released, wherein if the program determines that the set button is remained in a pressed position, continuing in the Step S14, and if the program determines that the set button is released, proceeding to Step S15;

Step S15: arranging the first terminal of the microcomputer control chip to output a pulse signal, controlling the infrared emitter for emitting the infrared pulse signal to the detection range, and then proceeding to Step S16;

Step S16: receiving signal reflected by the hand of the user by the infrared receiver, amplifying the analog signal by the amplifier, converting the amplified analog signal into a digital signal via the analog-to-digital conversion by the analog-to-digital converter, and proceeding to Step S17; and Step S17: storing result/value of the analog-to-digital conversion of the analog-to-digital converter in the R20 register and returning to the Step S5, and then exiting the setting mode and entering, a normal operation mode.

* * * * *